Figure 1:
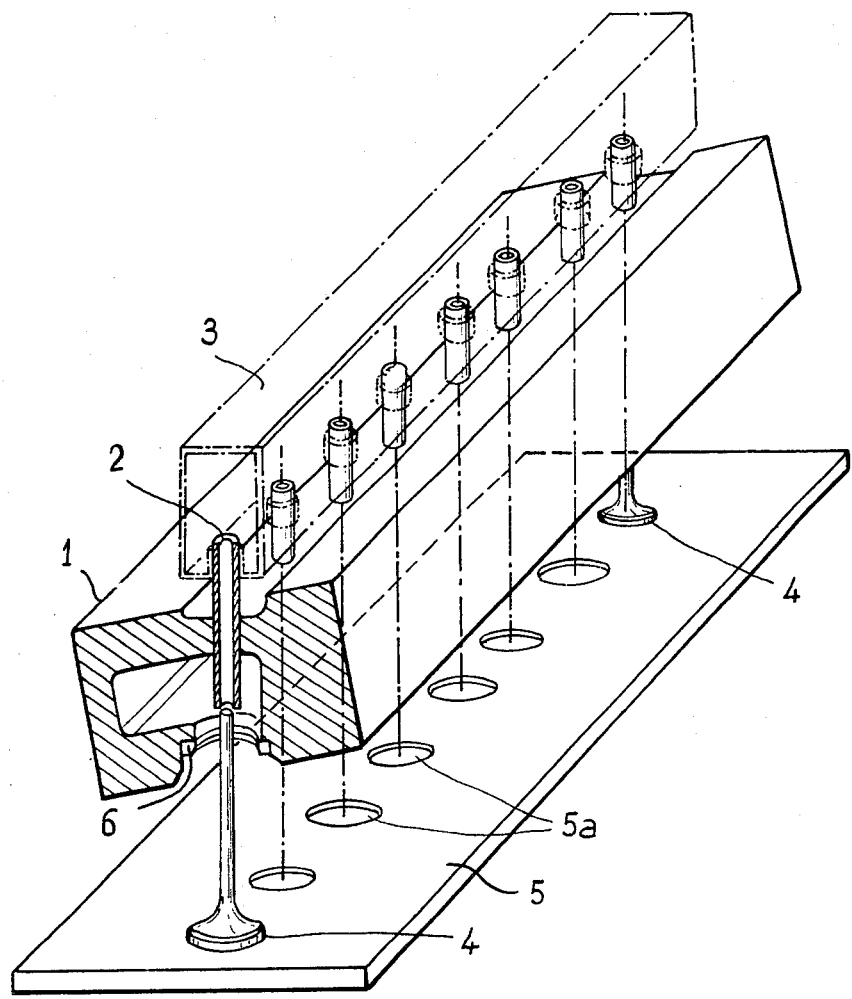

United States Patent
Godart et al.

[11] 3,898,726
[45] Aug. 12, 1975

[54] METHODS AND DEVICE FOR POSITIONING AND ASSEMBLING FREE-FITTING PARTS

[75] Inventors: Jean Godart; Guy Faure, both of Billancourt, France

[73] Assignees: Regie Nationale des Usines Renault, Billancourt; Automobiles Peugeot, Paris, both of France

[22] Filed: June 18, 1973

[21] Appl. No.: 370,650

[30] Foreign Application Priority Data
July 25, 1972   France .............................. 72.26705

[52] U.S. Cl. .............. 29/213; 29/DIG. 44; 269/239
[51] Int. Cl.² .......................................... B23P 19/04
[58] Field of Search ........ 29/156.4 R, 157.1 A, 434, 29/464, 213, 213 E, 214, 249, DIG. 44, 244; 269/287, 239, 43

[56] References Cited
UNITED STATES PATENTS

| | | | |
|---|---|---|---|
| 1,314,352 | 8/1919 | Morin | 29/156.4 R |
| 2,842,923 | 7/1958 | Kjellsen | 29/203 V |
| 2,858,597 | 11/1958 | Kraemer | 29/DIG. 44 |
| 3,299,502 | 1/1967 | Wanesky | 29/203 V |
| 3,417,856 | 12/1968 | O'Brien et al. | 29/203 V |
| 3,479,722 | 11/1969 | Maness | 29/213 |
| 3,667,103 | 6/1972 | Petree | 29/DIG. 44 |
| 3,698,057 | 10/1972 | Warner | 29/DIG. 44 |
| 3,736,651 | 6/1973 | Law | 29/DIG. 44 |

*Primary Examiner*—Richard J. Herbst
*Assistant Examiner*—Dan C. Crane
*Attorney, Agent, or Firm*—Stevens, Davis, Miller & Mosher

[57] ABSTRACT

Method of positioning parts to be assembled and of which one part has a portion fitting freely in a corresponding hole of the other receiving part, which consists in sucking through the hole of said receiving part the aforesaid portion of said one part after having presented the two parts substantially in mutual alignment and in close proximity to each other. This method is carried out by using a device comprising a vacuum line carrying said one parts and a recessed plate carrying the other parts for presenting the parts as mentioned hereinabove. The invention is applicable more particularly to the fitting of valves in the cylinder-heads of valve-gear machines.

1 Claim, 2 Drawing Figures

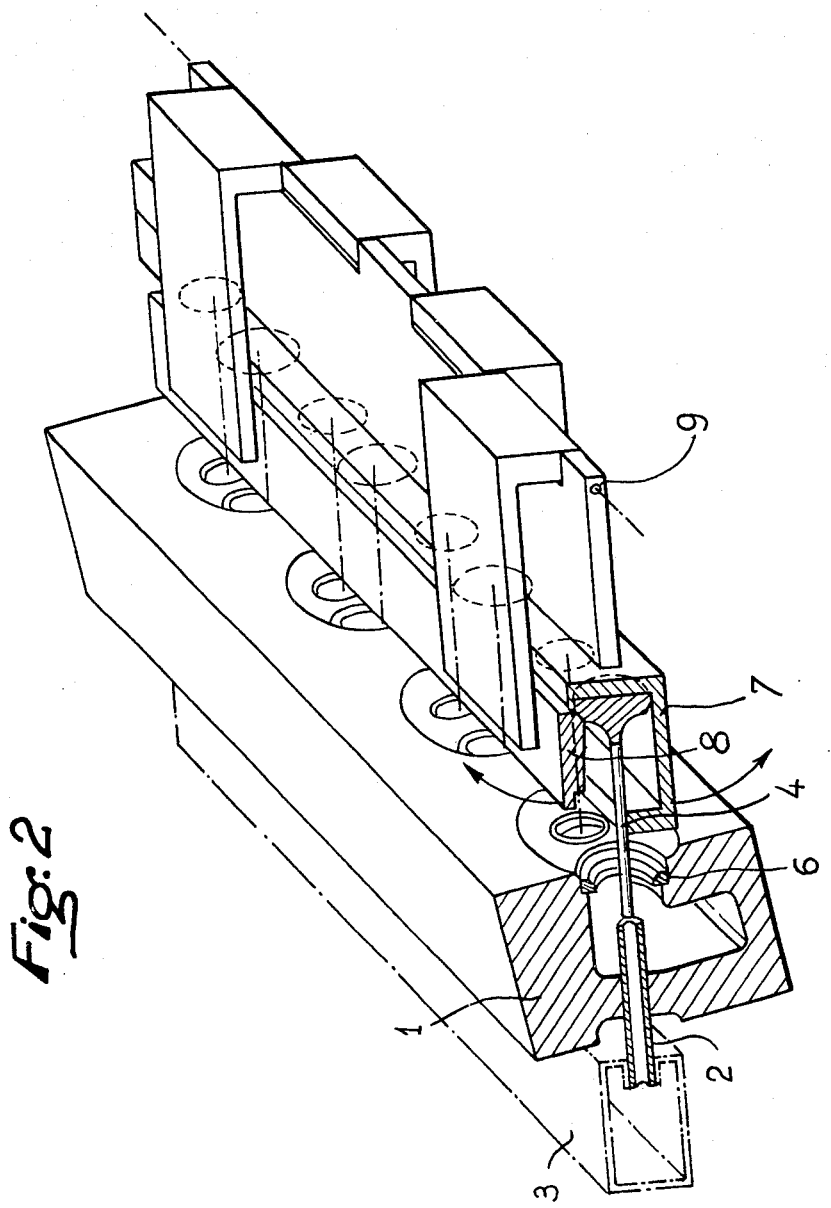

METHODS AND DEVICE FOR POSITIONING AND ASSEMBLING FREE-FITTING PARTS

This invention relates to the assembling of mechanical parts by free or loose fitting, as in the case of screws, pins, studs, valves and other parts comprising a portion to be engaged through a hole in another receiving part with which it is to be assembled.

Thus, for instance, in the motor industry, assembling the valves in the cylinder-heads of engines frequently includes the following operations:

Fitting the valve guides and seats automatically;
Machine-finishing the guides and seats;
Washing off any chips and impurities;
Manually positioning the valves in the cylinderhead disposed with the gasket face upwards, this operation being necessary, in this specific case, due to the accurate fit between the valve stem and its bore;
Positioning a valve holding bar;
Turning the cylinder-head upside down, i.e., with its gasket face facing downwards;
Automatically assembling the spring bearings, cups and split keys associated with each valve;
Etc . . . .

As a rule, manual assembly line operators have at their disposal only a simple compressed-air gun or blow-nozzle, and therefore the valve guide bores are cleaned only roughly. Moreover, they do not hesitate to force a hard fitting valve, and this may cause parts outside the permissible shape or dimensional tolerances, or parts not properly finished, to be fitted and assembled, or foreign substances to be introduced between a guide and its valve. When utilizing automatic assembling machines designed for fitting the parts under mechanical driving forces the same risks are observed, with the additional inconvenience deriving from the absence of a supervisor.

It is the essential object of the present invention to provide an improved method and an improved device for positioning and assembling parts notably in the field contemplated hereinabove, with a view notably:

to properly clean the bore or hole of the receiving part just before its engagement by the other part;

to positively prevent that an excessive effort be exerted for fitting one part into another;

to permit the easy and simultaneous positioning and assembling of a large number of parts, and also to perform these operations automatically.

Basically, the method of this invention for positioning parts to be assembled, one of these parts comprising a portion fitting freely in a corresponding hole of the other or receiving part, is characterised in that it consists in sucking through the hole of the receiving part the aforesaid portion of the one part, after presenting the two parts to each other in substantial alignment and in close vicinity to each other.

This method and the means for carrying out same will now be described by way of example with reference to the attached drawing illustrating diagrammatically by way of example the assembling of valves in the cylinder-head of an internal combustion engine; in the drawing:

FIG. 1 is a perspective view showing the cylinder-head and the means for fitting the valves therein, and FIG. 2 is a similar view of a cylinder-head and a different assembling device for fitting valves therein.

In the example illustrated in FIG. 1 the cylinder-head is shown with its gasket-receiving surface facing downwards and the guide valves 2 extending vertically, and the invention consisting in connecting to the upper ends of the guides a vacuum line 3 comprising suitable connecting unions or like means and presenting the set of valves 4 supported by a common support or plate 5 formed with recesses 5a engageable by the valve heads and registering with the lower ends of guides 2, the tolerances between the valve heads and the corresponding recesses being of the order of 2 mm (0.08 inch) along each one of the three coordinates axes.

When vacuum is created in the line 3 the air sucked through the guides removes therefrom all foreign substances left therein, whereafter the valve stems center themselves automatically in the guide on air films and rise until the valve heads engage the valve seats 6, unless said heads are stopped during their travel when a force greater than the force created by said vacuum retains one or more valves in an intermediate position, i.e. before they engage the relevant seats.

Of course, this method is applicable irrespective of the momentary orientation of the cylinder-head, as illustrated by the modified form of embodiment shown in FIG. 2, wherein the parts are presented in a substantially horizontal position with the ends of guides 2 opposite the valve seats 6 also connected to the vacuum line 3, and the valve stems 4 are presented in alignment with the ends of said guides on the seat side with the assistance of a device comprising valve holding means.

These valve holding means designated by the reference numerals 7 and 8 are of the collapsible type and therefore pivotally mounted about a hinge pin 9.

Preferably, these valve holding means are adapted to guide the valves as long as the guide are not properly or sufficiently engaged, the member 8 being retractable before its companion member 7, in this case. The holding members may also be such that they are adequate for holding the valves while exerting by themselves a resistance not sufficient for neutralizing the vacuum action, notably by being capable of yielding more or less under this action.

In certain engine types the valves are fitted in two steps, i.e. inlet valves on one side and exhaust valves on the other side. This dissociation may be necessary for example when two or four valves of each cylinder are not parallel, thus precluding the one-stroke positioning permitted by the method of this invention, which is independent of the mounting orientation. Said dissociation may also prove advantageous for detecting confusions between the two types of valves.

Thus, according to this invention, the valve positioning operation may be included in an assembling unit by utilizing simple, easily adaptable devices permitting the simultaneous assembling of a series of parts while ensuring an automatic checking of the assembly without any risk of damaging the parts, for in case of faulty parts these cannot be assembled and remain simply on their support or plate.

This method, intended more particularly for automatic assembling operations in the motor industry, is applicable to all types of valve-gear engines.

However, it is also applicable to the assembling of members comprising valve gears, such as compressors, pumps, air engines, etc . . . .

More generally, the present invention is applicable to all automatic assembling procedures involving parts comprising a portion adapted to be fitted in a non-tight manner in a corresponding bore or cavity of another part and more particularly to the simultaneous assembling of such parts of relatively reduced weight.

Although specific forms of embodiment of this invention have been described hereinabove and illustrated in the accompanying drawing, it will readily occur to those skilled in the art that various modifications and changes may be brought thereto without departing from the scope of the invention as set forth in the appended claims.

What is claimed is:

1. A device for assembling valves in an internal combustion engine having hollow valve guides for receiving the stems of said valves comprising:

positioning means for placing said valve stems in alignment with and in close proximity to one end of said valve guides including a valve support having collapsible holding members; and means for creating a vacuum at the other end of said hollow valve guides so that by said vacuum said stems are sucked into said hollow guides, said collapsible holding members being adapted to release said valves after said valves are sucked into said guides.

* * * * *